(12) United States Patent
Adachi

(10) Patent No.: US 8,724,897 B2
(45) Date of Patent: May 13, 2014

(54) PICTURE QUALITY CONTROLLING DEVICE, PICTURE QUALITY CONTROLLING METHOD, AND PICTURE QUALITY CONTROLLING PROGRAM

(75) Inventor: Takeshi Adachi, Saitama (JP)

(73) Assignees: Mitsumi Electric Co., Ltd., Tokyo (JP); ATRC Corporation, Saitama (JP)

( * ) Notice: Subject to any disclaimer, the term of this patent is extended or adjusted under 35 U.S.C. 154(b) by 77 days.

(21) Appl. No.: 13/574,025

(22) PCT Filed: Jan. 17, 2011

(86) PCT No.: PCT/JP2011/050644
§ 371 (c)(1),
(2), (4) Date: Jul. 19, 2012

(87) PCT Pub. No.: WO2011/089994
PCT Pub. Date: Jul. 28, 2011

(65) Prior Publication Data
US 2012/0288197 A1    Nov. 15, 2012

(30) Foreign Application Priority Data

Jan. 22, 2010   (JP) ................. 2010-012053

(51) Int. Cl.
*G06K 9/00*       (2006.01)
*G06T 5/40*       (2006.01)

(52) U.S. Cl.
CPC ...................... *G06T 5/40* (2013.01)
USPC ............ 382/168; 382/171; 382/172; 382/167

(58) Field of Classification Search
CPC .......... G06T 5/40; G06T 5/001; G06T 7/408; G06T 7/0081; G06T 2207/20148; H04N 1/4074; H04N 1/403; H04N 1/6027; H04N 9/405; H04N 1/60; G06K 9/4647; G06K 9/346; G06K 9/342; G06K 9/348; G06K 9/38

USPC ............. 382/168, 171, 172, 167; 348/65, 76, 348/558, 607, 239, E7.085; 358/1.9, 1.16; 375/E7.14; 600/109
See application file for complete search history.

(56) References Cited

U.S. PATENT DOCUMENTS

| | | | | |
|---|---|---|---|---|
| 5,209,220 A | * | 5/1993 | Hiyama et al. | ................ 600/109 |
| 5,379,757 A | * | 1/1995 | Hiyama et al. | ................ 600/109 |
| 7,916,214 B2 | * | 3/2011 | Kimura et al. | ................ 348/558 |
| 2007/0081721 A1 | | 4/2007 | Xiao et al. | |

FOREIGN PATENT DOCUMENTS

| | | | | |
|---|---|---|---|---|
| JP | 363040472 A | * | 2/1988 | ............... H04N 1/40 |
| JP | 2003-058141 | | 2/2003 | |

(Continued)

OTHER PUBLICATIONS

International Search Report mailed on Mar. 8, 2011.

*Primary Examiner* — Anh Do
(74) *Attorney, Agent, or Firm* — IPUSA, PLLC

(57) ABSTRACT

A picture quality controlling device (10) that controls a picture quality for an image signal which is input including: a histogram generation unit (14) generating a histogram for at least one of brightness, chromaticity, color, and frequency information pieces from an image contained in the image signal; a threshold value comparing unit (17) comparing the histogram with a threshold value previously set for the histogram in order to determine whether control of the picture quality for the image signal is necessary; and a picture quality controlling unit (18) extracting a histogram pattern corresponding to the histogram from a reference table including plural predetermined histogram patterns, and controlling the picture quality based on a controlled parameter corresponding to the extracted histogram pattern if the control is determined to be necessary based on a result obtained by the threshold value comparing unit.

12 Claims, 14 Drawing Sheets

(56) References Cited

FOREIGN PATENT DOCUMENTS

| JP | 2003-259206 | 9/2003 |
| JP | 2004-040448 | 2/2004 |
| JP | 2004-198479 | 7/2004 |
| JP | 2005-094596 | 4/2005 |
| JP | 2007-067907 | 3/2007 |

\* cited by examiner

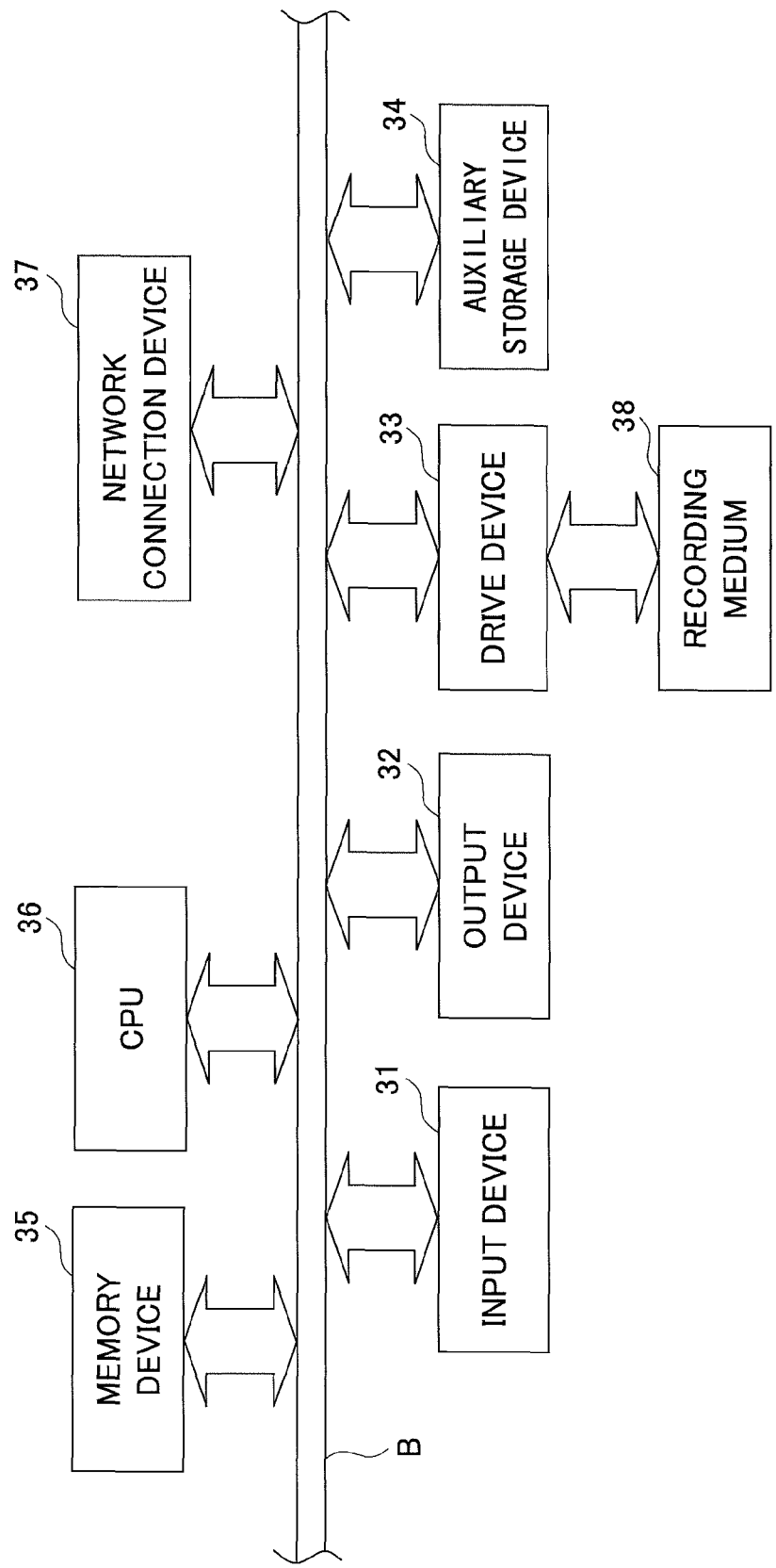

FIG.4
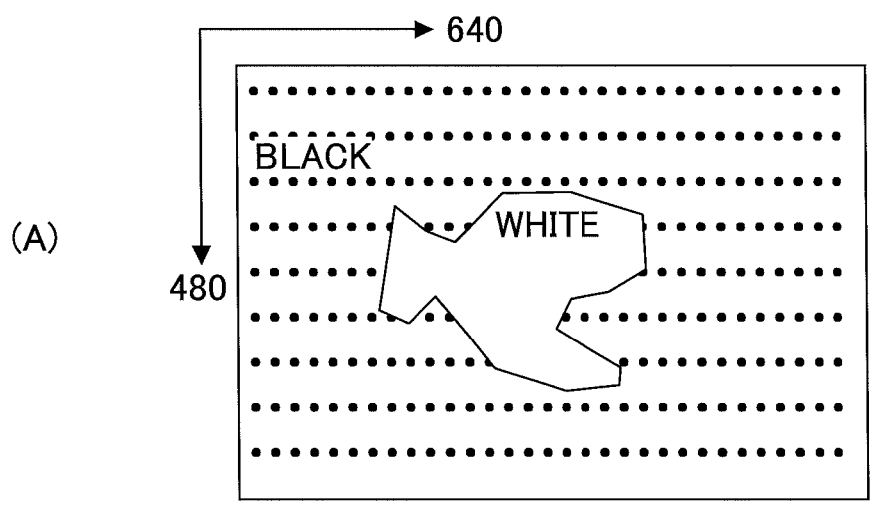
(A)
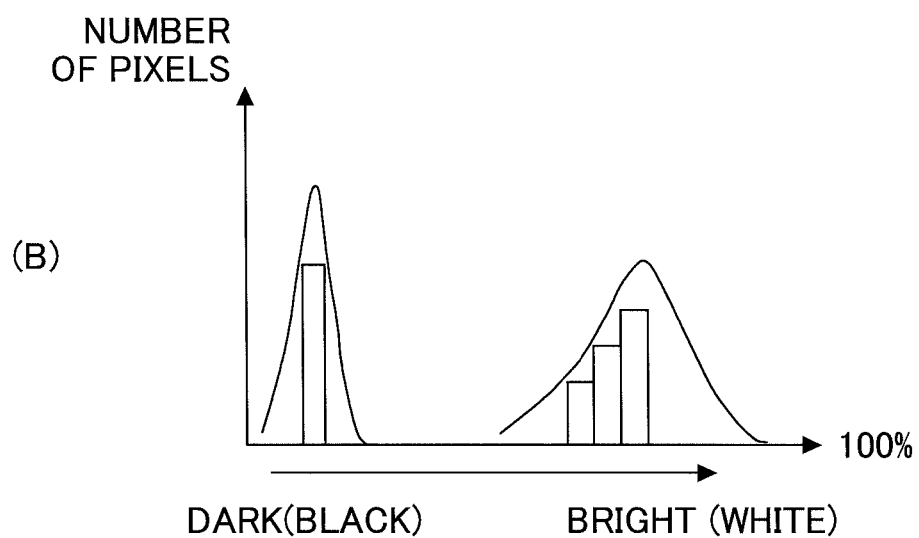
(B)

FIG.6
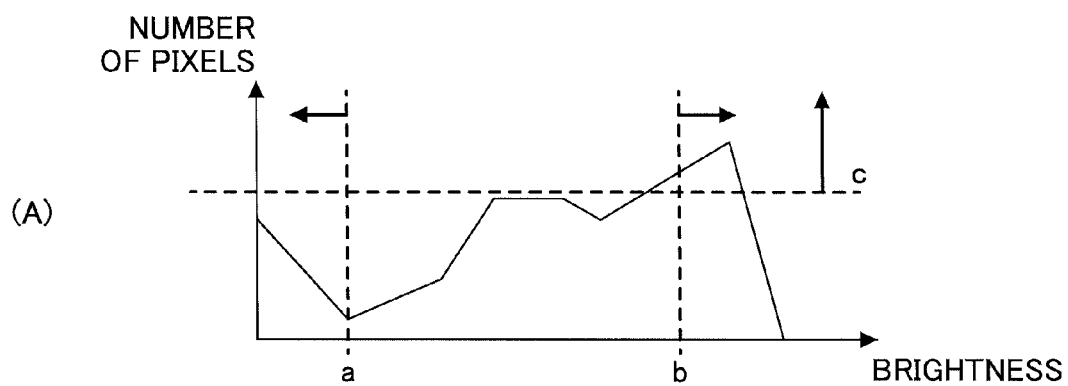
(A)
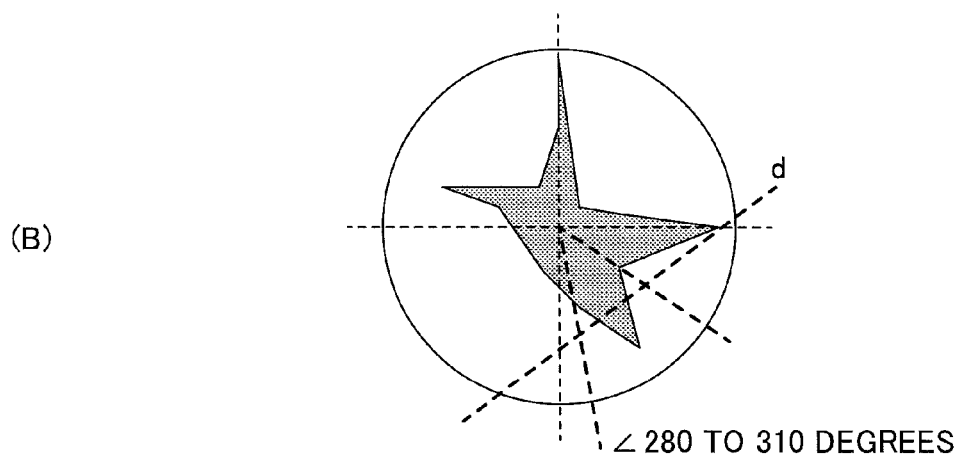
(B)
∠ 280 TO 310 DEGREES

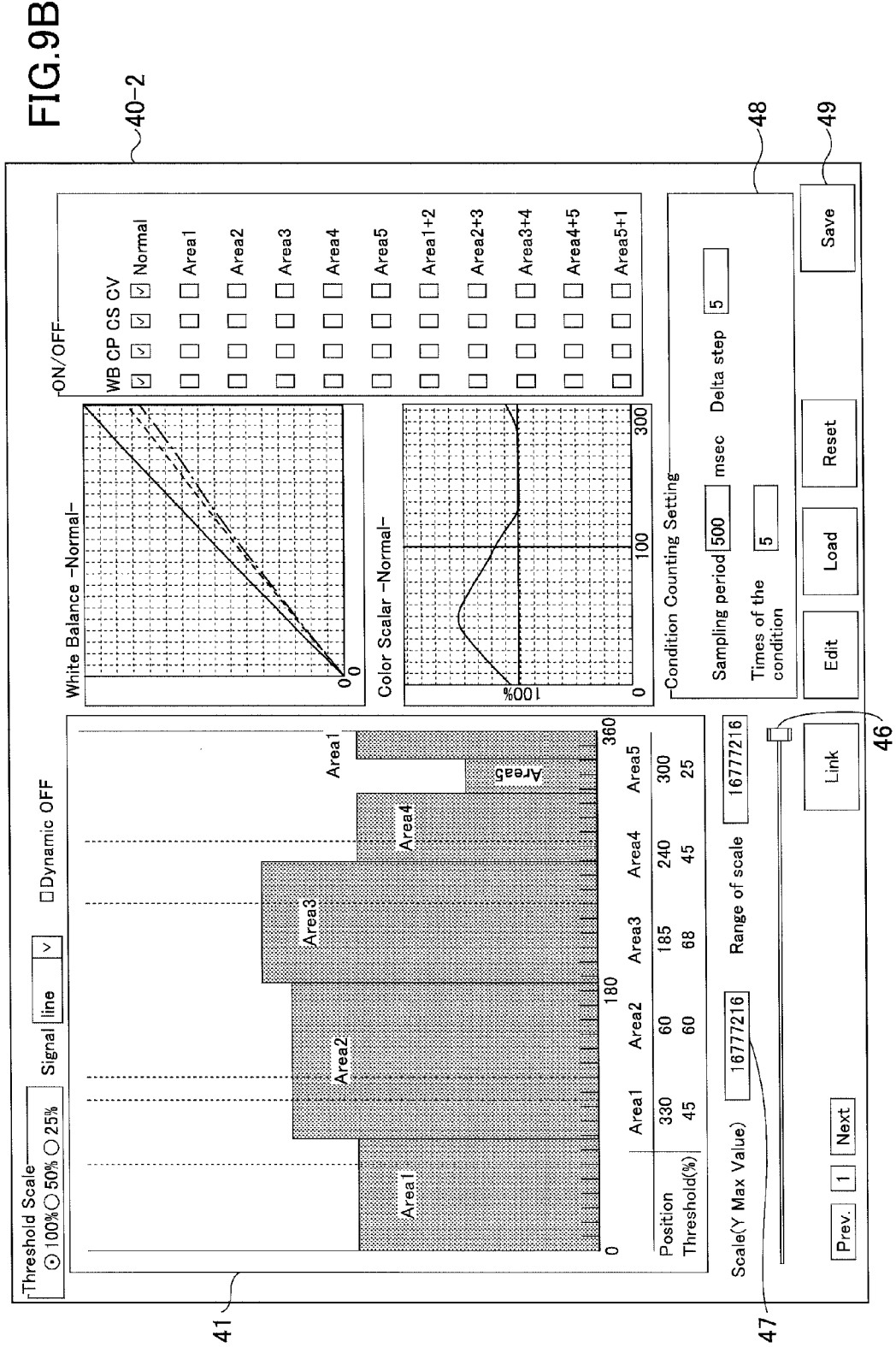

PICTURE QUALITY CONTROLLING DEVICE, PICTURE QUALITY CONTROLLING METHOD, AND PICTURE QUALITY CONTROLLING PROGRAM

TECHNICAL FIELD

The present invention generally relates to a picture quality controlling device, a picture quality controlling method, and a picture quality controlling program, and more specifically to a picture quality controlling device, a picture quality controlling method, and a picture quality controlling program for realizing high definition and high picture quality.

BACKGROUND ART

Heretofore, digitization of broadcasting, practical application to Hi-Vision broadcasting, and a tendency to high definition and high picture quality in an imaging technique of next generation high definition broadcasting having a resolution of 2K4K (4096×2160 pixels) or the like constantly and rapidly develop. Along with this, a low cost and high definition image processing technique is demanded on a side of a receiver. However, market prices of receiver terminals show an accelerated decline along with increment of a demand for the receiver terminals. In spite of the tendency to high definition and high resolution, the accelerated decline of the market prices of receiver terminals prevents an improved technique on the receiver side from developing along with this demand for the high definition image processing technique.

For example, Patent Document 1 discloses a technique of controlling picture quality by determining picture quality information only by a brightness histogram.

[Patent Document 1] Japanese Laid-open Patent Publication No. 2005-94596.

DISCLOSURE OF THE INVENTION

Problems to be Solved by the Invention

However, in determining picture quality information using only a brightness histogram, the color or the like cannot be controlled, thereby preventing improvement in the picture quality.

Therefore, the embodiments of the present invention are provided in consideration of the above problems. The object of the present invention is to provide a picture quality controlling device, a picture image controlling method, and a picture image controlling program for realizing an image with high definition and high picture quality.

Means for Solving Problems

In order to solve the problems, the preset invention adopts measures for solving the problems having the following features.

According to a first aspect, there is provided a picture quality controlling device that controls a picture quality for an image signal which is input including a histogram generation unit configured to generate a histogram for at least one of a brightness information piece, a chromaticity information piece, a color information piece, and a frequency information piece, the brightness, chromaticity, color, and frequency information pieces being obtained from an image contained in the image signal; a threshold value comparing unit configured to compare the histogram generated by the histogram generation unit with a threshold value previously set for each of the histogram in order to determine whether control of the picture quality for the image signal is necessary; and a picture quality controlling unit configured, if the control of the picture quality for the image signal is determined to be necessary based on a result obtained by the threshold value comparing unit, to extract a histogram pattern corresponding to the histogram generated by the histogram generation unit from a reference table including a plurality of predetermined histogram patterns, and control the picture quality for the image signal based on a controlled parameter corresponding to the extracted histogram pattern.

According to the first aspect, an image with high definition and high picture quality is obtainable.

According to a second aspect, there is further provided a reference table generation unit configured to generate the reference table including the plurality of predetermined histogram patterns in association with each of the brightness, chromaticity, color, and frequency information pieces According to the second aspect, by generating the reference table containing the plural histogram patterns corresponding to the plural information, the picture quality for the image signal can be improved with high accuracy.

According to a third aspect, the reference table generation unit generates the reference table including a matrix of the histogram patterns corresponding to the brightness information piece and the color information piece.

According to the third aspect, an integrated picture quality control can be performed. Therefore, it is possible to realize an image with high definition and high picture quality.

According to a fourth aspect, there is further provided a screen generation unit configured to generate a display screen enabling a user to set the threshold value.

According to the fourth aspect, by generating and presenting a setup screen, the user can easily set an accurate value as aimed without failing to set setup conditions.

According to a fifth aspect, there is provided a picture quality controlling method that controls a picture quality for an image signal which is input, the picture quality controlling method including: generating a histogram for at least one of a brightness information piece, a chromaticity information piece, a color information piece, and a frequency information piece, the brightness, chromaticity, color, and frequency information pieces being obtained from an image contained in the image signal; comparing the histogram generated by the histogram generation unit with a threshold value previously set for each of the histogram in order to determine whether control of the picture quality for the image signal is necessary; and controlling the picture quality, if the control of the picture quality for the image signal is determined to be necessary based on a result obtained by the comparing, by extracting a histogram pattern corresponding to the histogram generated by the histogram generation unit from a reference table including a plurality of predetermined histogram patterns, and controlling the picture quality for the image signal based on a controlled parameter corresponding to the extracted histogram pattern.

According to the fifth aspect, an image with high definition and high picture quality is obtainable.

According to a sixth aspect, there is further provided generating the reference table including the plurality of predetermined histogram patterns in association with each of the brightness, chromaticity, color, and frequency information pieces.

According to the sixth aspect, by generating the reference table containing the plural histogram patterns corresponding to the plural information, the picture quality for the image signal can be improved with high accuracy.

According to a seventh aspect, the generating the reference table generates the reference table including a matrix of the histogram patterns corresponding to the brightness information piece and the color information piece.

According to the seventh aspect, an integrated picture quality control can be performed. Therefore, it is possible to realize an image with high definition and high picture quality.

According to an eighth aspect, there is further provided generating a display screen enabling a user to set the threshold value.

According to the eighth aspect, by generating and presenting a setup screen, the user can easily set an accurate value as aimed without failing to set setup conditions.

According to a ninth aspect, there is provided a picture quality controlling program that controls a picture quality for an image signal which is input, the picture quality controlling program causing a computer to function as: a histogram generation unit configured to generate a histogram for at least one of a brightness information piece, a chromaticity information piece, a color information piece, and a frequency information piece, the brightness, chromaticity, color, and frequency information pieces being obtained from an image contained in the image signal; a threshold value comparing unit configured to compare the histogram generated by the histogram generation unit with a threshold value previously set for each of the histogram in order to determine whether control of the picture quality for the image signal is necessary; and a picture quality controlling unit configured, if the control of the picture quality for the image signal is determined to be necessary based on a result obtained by the threshold value comparing unit, to extract a histogram pattern corresponding to the histogram generated by the histogram generation unit from a reference table including a plurality of predetermined histogram patterns, and control the picture quality for the image signal based on a controlled parameter corresponding to the extracted histogram pattern According to the ninth aspect, an image with high definition and high picture quality is obtainable.

Further, by installing the program in a general purpose computer and so on, the picture quality control of the embodiment of the present invention can be easily realized.

According to a tenth aspect, there is further provided a reference table generation unit configured to generate the reference table including the plurality of predetermined histogram patterns in association with each of the brightness, chromaticity, color, and frequency information pieces.

According to the tenth aspect, by generating the reference table containing the plural histogram patterns corresponding to the plural information, the picture quality for the image signal can be improved with high accuracy.

According to an eleventh aspect, the reference table generation unit generates the reference table including a matrix of the histogram patterns corresponding to the brightness information piece and the color information piece.

According to the eleventh aspect, an integrated picture quality control can be performed. Therefore, it is possible to realize an image with high definition and high picture quality.

According to a twelfth aspect, there is further provided a screen generation unit configured to generate a display screen enabling a user to set the threshold value.

According to the twelfth aspect, by generating and presenting a setup screen, the user can easily set an accurate value as aimed without failing to set setup conditions.

The above reference symbols are attached only for reference, and the present invention is not limited to modes illustrated in figures.

Effect of the Invention

According to the embodiment of the present invention, it is possible to realize an image with high definition and high picture quality.

BRIEF DESCRIPTION OF DRAWINGS

FIG. 2 illustrates an example hardware structure enabling picture quality control of the embodiment of the present invention.

FIG. 4 illustrates picture quality control of the embodiment.

FIG. 6 illustrates an exemplary threshold comparison in the embodiment.

FIG. 9B illustrates an exemplary setup screen of the embodiment.

BEST MODE FOR CARRYING OUT THE INVENTION

Figure 1:
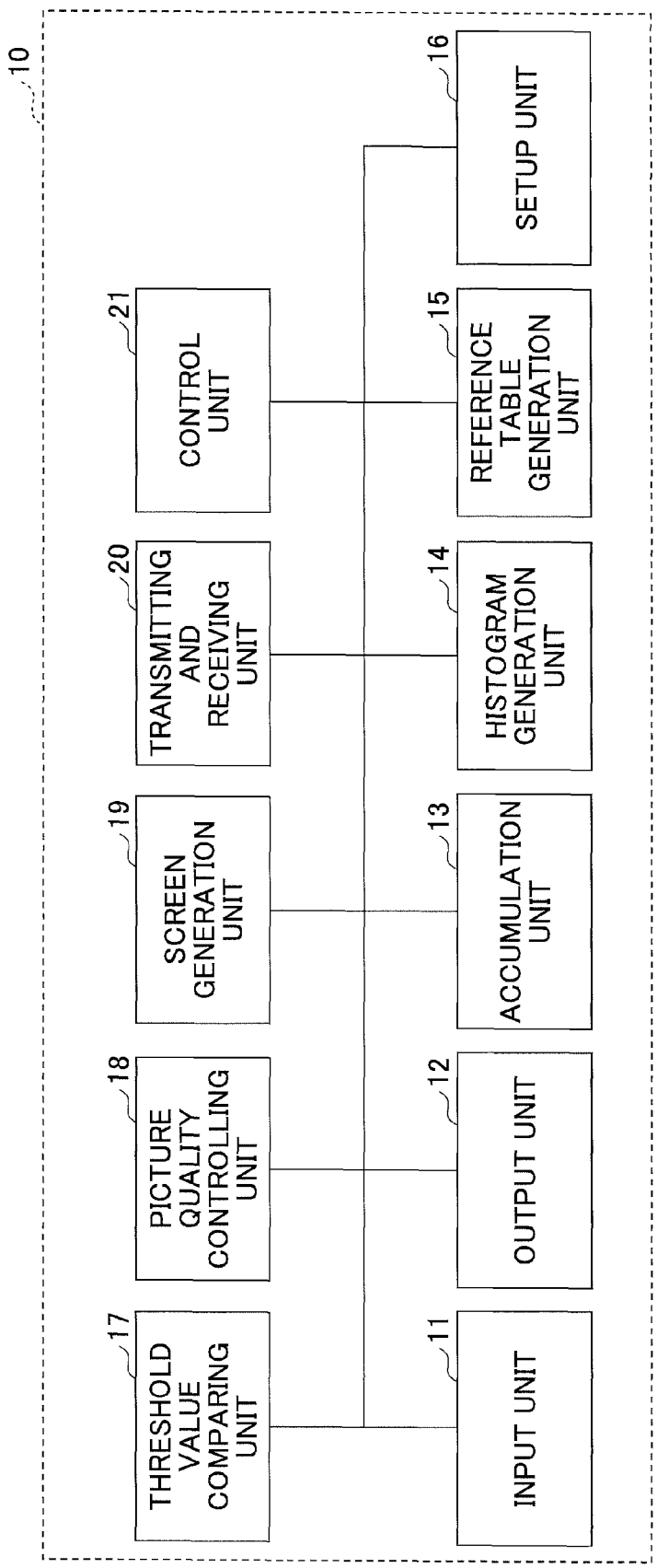
FIG. 1 illustrates an exemplary function structure of a picture quality controlling device of an embodiment.

According to an exemplary improved technique, because only contrast is improved by analyzing only simple brightness information of input image signal components, various image information pieces may not be accurately grasped and reproduced. Therefore, a range of improving picture quality is limited. With this, a color reproduction range on a bright screen and a color reproduction range on a dark screen greatly differ. However, since there is no means for detecting this difference, the difference may not be controlled.

For example, when character information or the like is viewed on a display screen such as a monitor, a color temperature of white balance is preferably 9300 K. When a flesh color or a warm color is viewed, it is difficult to properly control the picture quality since an appropriate detecting unit is necessary.

Further, if image information including many high frequency components is viewed, it is known that a gradation sequence having good linearity enables a viewer to see such image information. Further, because a gradation sequence in image information having many low frequency components is prone to be suitable for a dynamic image imposed by contrast, it is preferable to set the gradation sequence along a nonlinear curve. However, an image reproducing technique is realized only by a static adjustment Said differently, it is difficult to carry out these adjustment and setup in reproducing such a static image in association with an image content. Therefore, the static adjustment and setup are performed as a predetermined correction. Therefore, a blackout phenomenon may be caused when high frequency components in a dark scene (e.g., brunet hair in a moonless night or a crow in a moonless night) becomes a black level or lower, or an image degradation phenomenon may be caused when a tilt error occurs in an intermediate brightness portion between a rise tilt of brightness information and a rise tilt of color information.

Further, when a sharpness control is provided with a sharpness level such as a pre-shoot amount and an over-shoot amount without exception regardless of the frequency component, even though a good image quality is acquired for low frequency components, many false shoot signals having widths substantially the same as those of original signals are generated for high frequency components. Therefore, sharpness is lost in the high frequency components, unlike in the low frequency components.

As for a noise reduction function, if the amount of reducing noise is uniformly set irrespective of the frequency components, in a case where the noise approximates a high frequency component, the high frequency component of an original signal is simultaneously lost. Therefore, the high frequency component of the original signal is simultaneously lost. Thus, there may occur a defect phenomenon that the image blurs. Therefore, there may occur a trade-off problem that the picture quality is degraded in the high frequency component by an adverse effect when the technique of improving the picture quality effective for the low frequency component is used.

<Embodiments of the Present Invention>

Within the embodiment of the present invention, in addition to a picture quality control by determining picture quality information using only the above brightness histogram, chromaticity, color and frequency are expressed by histograms. Then, the picture quality control is carried out by using detailed information of the chromaticity, color and frequency histograms thereby realizing high picture quality.

Specifically, four types of histograms including a brightness histogram, a chromaticity histogram, a color histogram, and a frequency histogram are generated from, for example, input image signal components. Then, the generated histogram information is analyzed to thereby set up an arbitrary threshold value and generate a reference table (a look up table (LUT)) for the control based plural histogram patterns. Within the embodiment of the present invention, the generated histogram may not be the above mentioned four types. For example, only one type of the histograms other than the brightness histogram may be analyzed. Further, for example, at least two types of the histograms among the four types of the histograms may be analyzed. Further, another histogram related to a picture quality other than the tables of the four types may be generated to thereby generate a reference table (a look up table) for controlling the picture quality based on a pattern of the other histogram.

Further, within the embodiment of the present invention, various image quality controlling circuits for contrast, black level, sharpness, color rendition, noise reduction or the like are dynamically controlled in response to image information of the input image contents by using the generated reference table (the look up table) or the like. Said differently, the embodiment of the present invention provides a picture quality improving technique for detecting the above described various histograms and controlling the picture quality.

Hereinafter, a mode of preferably applying the picture quality controlling device, the picture quality controlling method and the picture quality controlling program of the embodiment of the present invention is described in reference to figures or the like.

<Exemplary Functional Structure of the Picture Quality Controlling Device>

FIG. 1 illustrates an exemplary function structure of the picture quality controlling device of the embodiment. The picture quality controlling device 10 includes an input unit 11, an output unit 12, an accumulation unit 13, a histogram generation unit 14, a reference table generation unit 15, a setup unit 16, a threshold value comparing unit 17, a picture quality controlling unit 18, an screen generation unit 19, a transmitting and receiving unit 20, and a control unit 21.

The input unit 11 receives various inputs related to the picture quality control from a user or like such as an image input instruction, a histogram generation instruction, a threshold value comparison instruction, a reference table generation instruction, a picture quality control instruction, and a transmission and receipt instruction. For example, the input unit 11 includes a keyboard, a pointing device like a mouse, an audio input interface like a microphone, or the like.

The output unit 12 displays image information which is input and is not controlled yet, image information of which picture quality is controlled, an instruction input by the input unit 11, and a histogram, a reference table, a setup content, a threshold comparison information, picture quality control data, and a setup display screen, which are generated based on the instruction input by the input unit 11. Further, the output unit 12 outputs voice. The output unit 12 has a screen display function using a display or the like and a voice output function using a speaker or the like.

The accumulation unit 13 accumulates an input image, brightness information to be described later, chromaticity information, color information, various histogram of frequency information, threshold comparison information, a reference table (a look up table), various information such as picture quality control information, various setup information for performing a picture quality control process of the embodiment, intermediate information of the picture quality control process, a result of the picture quality control process, and so on. The accumulation unit 13 can accumulate various data such as control data, threshold comparison information and LUT, which are received from an external device or the like via the transmitting and receiving unit 30.

The histogram generation unit 14 generates a histogram at least one piece of information pieces of brightness information, chromaticity information, color information and frequency information, which are obtained for each pixel of an image contained in an image as an element for determining the picture quality corresponding to the input image signal. A specific process by the histogram generation unit 14 is described later.

Before the picture quality control process is performed, the reference table generation unit 15 prepares a LUT including controlled parameters corresponding to a histogram pattern. The histogram patter is obtained in association with at least one of histograms of brightness information, the chromaticity information, the color information and the frequency information, which histograms are obtained by the histogram generation unit 14. Due to the LUT prepared as described above, it is possible to perform the image control process to be performed later with a high accuracy and at a high speed.

Specifically, the reference table generation unit 15 may generate the LUT using predetermined plural types of brightness histogram patterns for the brightness histogram. The reference table generation unit generates LUTs using plural types of histogram patterns for each of the chromaticity histogram, the color histogram, and the frequency histogram in a manner similar to the LUT using the brightness histogram pattern. The number of the plural types of histogram patterns may be arbitrarily determined for each histograms.

Further, the reference table generation unit 15 may generates a LUT combining plural histogram patterns so as to be like a matrix. The reference table generation unit 15 makes the accumulation unit 13 accumulate the generated LUT so that the generated LUT can be read and changed when necessary.

By generating the LUT as described above, it is possible to dynamically control a color picture quality at a high speed by detecting the histogram pattern corresponding to the brightness histogram of the input image generated by the histogram generation unit 14 and the picture quality is controlled so that the generated histogram becomes an ideal histogram pattern using the detected histogram pattern. An LUT is generated using plural histograms and the picture quality is controlled using the generated LUT thereby dynamically controlling the picture quality with high accuracy and integrality. A specific process by the reference table generation unit 15 is described later.

The setup unit 16 sets up various conditions for controlling the picture quality in the embodiment such as the types and the conditions of the histograms generated by the histogram generation unit 14 described above, the condition of the LUT generated by the reference table generation unit 15, and the threshold value used in the threshold value comparing unit 17. The various conditions are set up by the setup unit 16 when a user or the like instruct so using the input unit 11. A screen or the like for setting the threshold value or the like is generated by the screen generation unit 19. The generated screen or the like is displayed by the output unit 12 or the like. With this, the user can accurately perform various setting from a setup screen displayed on the output unit 12. The setup unit 16 accumulate various conditions such set by the user. The various setup conditions or the like set up in the setup unit 16 are described later.

The threshold value comparing unit 17 arbitrarily compares the various histograms generated by the histogram generation unit 14 with predetermined thresholds corresponding to the histograms. Then, it is determined whether the picture quality is controlled based on the result of the above comparison. The threshold value comparing unit 17 previously sets up a threshold value for individually starting to control the picture quality based on histogram detection information pieces generated by the histogram generation unit 14. The histogram detection information pieces used for the above setup is up to 4 types. It is possible to set the position of the threshold value at an arbitrary position where the optimum picture quality is obtained. The picture quality controlling unit controls the picture image corresponding to an input image so as to improve the picture quality based on the LUT generated by the reference table generation unit 15. Specifically, the picture quality controlling unit 18 generates a predetermined histogram of the embodiment from the input image signal. The predetermined histogram is at least one of the brightness histogram, the chromaticity histogram, the color histogram, and the frequency histogram. The setup unit 16 previously determines the histogram to be generated. The accumulating unit 13 accumulates the generated histogram.

The picture quality controlling unit 18 extracts one histogram pattern corresponding to the generated histogram by checking the LUT of the various histogram patterns generated by the reference table generation unit 17. Further, the picture quality controlling unit 18 controls the picture quality of the image signal based on a picture quality controlled parameter obtained from the histogram pattern so that the histogram of the image signal becomes the same as the extracted histogram pattern.

Thus, the picture quality controlling unit 18 controls the picture quality such as contrast, black level, sharpness, color rendition, and noise reduction using the LUT, and dynamically controls the picture quality in response to the image information such as the input image contents.

The screen generation unit 19 generates a screen for enabling the user to setup various conditions in effecting the picture quality control process of the embodiment by the above setup unit 16. The screen generation unit 19 makes the output unit 12 display the generated screen. An exemplary screen generated by the screen generation unit 19 is described later in detail.

The transmitting and receiving unit 20 is a communication interface for sending and receiving various data such as control data, input image data, histogram, threshold value comparison information, LUT, and image information with its picture quality being improved to or from another device via a wired or wireless communication network or the like.

The control unit 21 controls an entire functional structure of the picture quality controlling device 10. Specifically, the control unit 21 performs various controls such as generation of the histogram, generation of the LUT, setup of the various conditions for each user, setting the threshold value, sending and receiving of the data, and the picture quality control.

<Hardware Structure>

An exemplary structure of the above picture quality controlling device 10 is described. The picture quality controlling device 10 may be, for example, a general-purpose personal computer or a server. By installing an execution program (a picture quality control program) which makes a computer perform various processes of the embodiment of the present invention, the picture quality control process of the present embodiment of the present invention can be realized.

FIG. 2 illustrates an example hardware structure enabling the picture quality control of the embodiment of the present invention. The structure of FIG. 2 is applicable to various structures of the picture quality controlling device 10. The computer illustrated in FIG. 2 includes an input device 31, an output device 32, a drive device 33, an auxiliary storage device 34, a memory device 35, a Central Processing Unit (CPU) 36 for performing various controls, and a network connection device 37. These are mutually connected via a system bus B.

The input device 31 is provided for a user or the like to run programs and input various operation signals, and includes a keyboard, a pointing device such as a mouse. The output device 32 includes a display for displaying various windows, data or the like necessary for operating the computer which carries out processes of the embodiment of the present invention. The output device 32 can display execution transit, results, or the like of the program with a control program installed in the CPU 36. Further, the output unit 32 may have functions as a printer. In this case, various information pieces can be printed on a printing medium such as a paper and provided to a user.

Within the embodiment, the execution program installed on the computer may be provided by a transitory or non-transitory recording medium 38 such as a CD-ROM.

The recording medium 38 having the execution program recorded on it may be installed on the drive device 33. The execution program included in the recording medium 38 is installed on the auxiliary storage device 34 via the driving device 33 from the recording medium 38. The recording medium 38 may be various types of recording media other than the CD-ROM. The recording medium 38 is, for example, a flexible disc or a magnet-optical disk which optically, electrically or magnetically record information, or a semiconductor memory such as a ROM or a flash memory which electrically record information.

The auxiliary storage device 34 is a storage unit such as a hard disk. The auxiliary storage device 34 stores the execution program of the embodiment, a control program installed on the computer, various data such as the histogram, the LUT, the execution transit and the result generated or set up in the embodiment. The auxiliary storage device 34 can input or output the information if necessary.

The memory device 35 stores the execution program which is read out of the auxiliary storage device 34 by the CPU 36, or the like. The memory device 35 includes a Read Only Memory (ROM), a Random Access Memory (RAM) or the like.

The CPU 36 may realize various processes by controlling an entire process of the computer such as various calculations and data input and output to and from various hardware components based on a control program such as an Operating System (OS) and the execution program, which is read out and stored by and the memory device 35. The CPU 36 can acquire various information such as a controlled parameter necessary for execution of the program and input setup information from an auxiliary storage device 34, and stores a result executed by the program and the above various information in the auxiliary storage device 34.

When the network connection device 37 is connected to a communication network or the like, the network connection device 37 may obtain the execution program from another terminal or the like connected to the communication network, or provide execution results obtained by performing the execution program or the execution program itself of the embodiment of the present invention to the other terminal and so on. Further, various setup information or the like such as an image signal component, a LUT, and a threshold value, which are input from an external device or the like connected to the network by the network connection device 37.

With the above described device structure, the picture quality control process of the embodiment can be carried out. Further, by installing the program on a general purpose computer or the like, the picture quality control process of the embodiment of the present invention can be easily realized.

<Generation of Histogram>

Figure 3A:
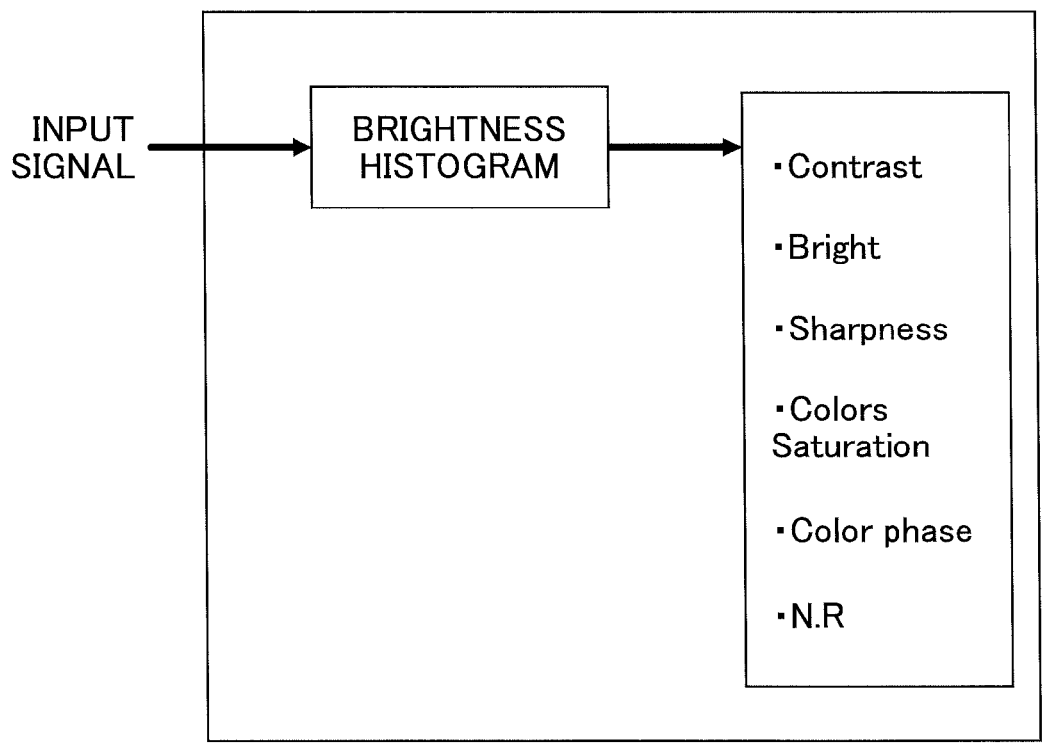
FIG. 3A schematically illustrates an example of histogram generation.
Figure 3B:
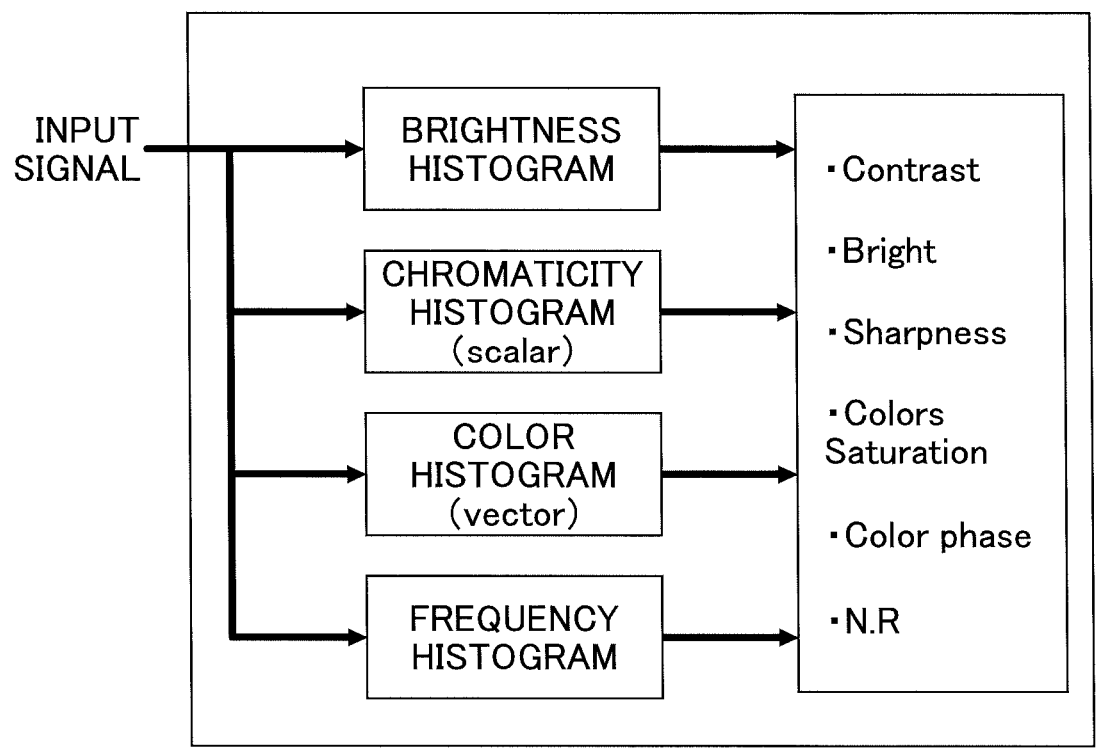
FIG. 3B schematically illustrates another example of histogram generation.

An example of generating the histogram in the above described histogram generation unit 14 is described next. FIG. 3A and FIG. 3B schematically explain generation of the histogram. As an example, referring to FIG. 3A, only the brightness histogram is used to determine the picture information for the input signal. The picture qualities such as "Contrast", "Bright", "Sharpness", "Colors", "Saturation", "Color Phase", and "N.R. (Noise Reduction)" are controlled using the result of the determination.

However, even if the picture image information is determined using only the brightness information piece, a color or the like cannot be controlled and the picture quality is not improved. Therefore, within the embodiment, the picture quality for the input signal is controlled by generating the histogram which is a main element for determining the image other than the brightness histogram and using one or more of the generated histogram values thereby further improving the picture quality.

Within the embodiment, the histogram is generated by adopting at least one of the four types of main elements of determining the image, i.e., the brightness, chromaticity, color, and frequency information pieces, as illustrated in FIG. 3B. The picture quality is determined using any one or more of the obtained brightness histogram, the chromaticity histogram (scalar), the color histogram (vector), and the frequency histogram thereby controlling the picture quality for the input signal such as "Contrast", "Bright", "Sharpness", "Colors Saturation", "Color Phase", and "N.R.".

With this, it is possible to improve the picture quality by further optimizing a high picture quality since the picture quality can be controlled based on the histograms obtained using the chromaticity, color and frequency information pieces in addition to the brightness information piece used in determining the picture quality information according to the above example.

FIG. 4 illustrates the picture quality control of the embodiment. Referring to (A) of FIG. 4, an exemplary picture image of 480 pixels long×640 pixels wide is illustrated. Referring to (B) of FIG. 4, numbers of pixels (the ordinate) relative to the color brightness (the abscissa) from dark (black) to bright (white) for each image pixel of the image illustrated in (A) of FIG. 4.

An area of dots in (A) of FIG. 4 designates a black area, and an area surrounded by a non-straight line with closed ends designates a white area. Within the embodiment, the image contained in the image input into the picture quality controlling device 10 is not limited to a monochrome image illustrated in (A) of FIG. 4 and may include a color image.

Referring to (A) of FIG. 4, the pixels have their own brightness. There are various gradation sequence between black and white such as black, dark black, bright black, and white. Therefore, the brightness information piece of each pixel contained in the image illustrated in (A) of FIG. 4 is obtained, and the obtained bright information piece is changed to a histogram showing distribution of the number of pixels. An image condition is read from the histogram so that the picture quality of the image is controlled.

Within the embodiment, in a manner similar to the above described brightness, the picture quality information of the chromaticity information piece, the color information piece, and the frequency information piece is obtained from each pixel in a manner similar to the brightness information piece. The picture quality information is changed to histograms. The picture quality is controlled using the histograms corresponding to the chromaticity, color and frequency information pieces in a manner similar to the histogram corresponding to the brightness information piece to thereby control the picture quality illustrated in FIG. 3B.

<Exemplary Histogram>

Next, an exemplary histogram of the embodiment is explained in reference of figures. Within the embodiment, the picture quality of the input image signal component is controlled using contrast, black level, sharpness, chromaticity HSV (Hew, Saturation, Vector), and noise based on the number of pixels of the four types of image components such as the brightness, chromaticity, color, and frequency information pieces, and a histogram pattern.

When the histogram generation unit 14 receives the image signal as described above, the histogram generation unit 14 sends the received image signal to, for example, a detection circuit for detecting the four types of histograms. The detection circuit detects and extracts the four types of histograms by simultaneously performing a first detection for the brightness histogram, a second detection for the chromaticity histogram, a third detection for the color histogram, and a fourth detection for the frequency histogram. The detected histogram corresponds to one screen which is formed by entire resolution information of the input signal. Specifically, the histogram frequency in VGA is about 300,000 since the size of the VGA is 640×480=307,200.

Figure 5:
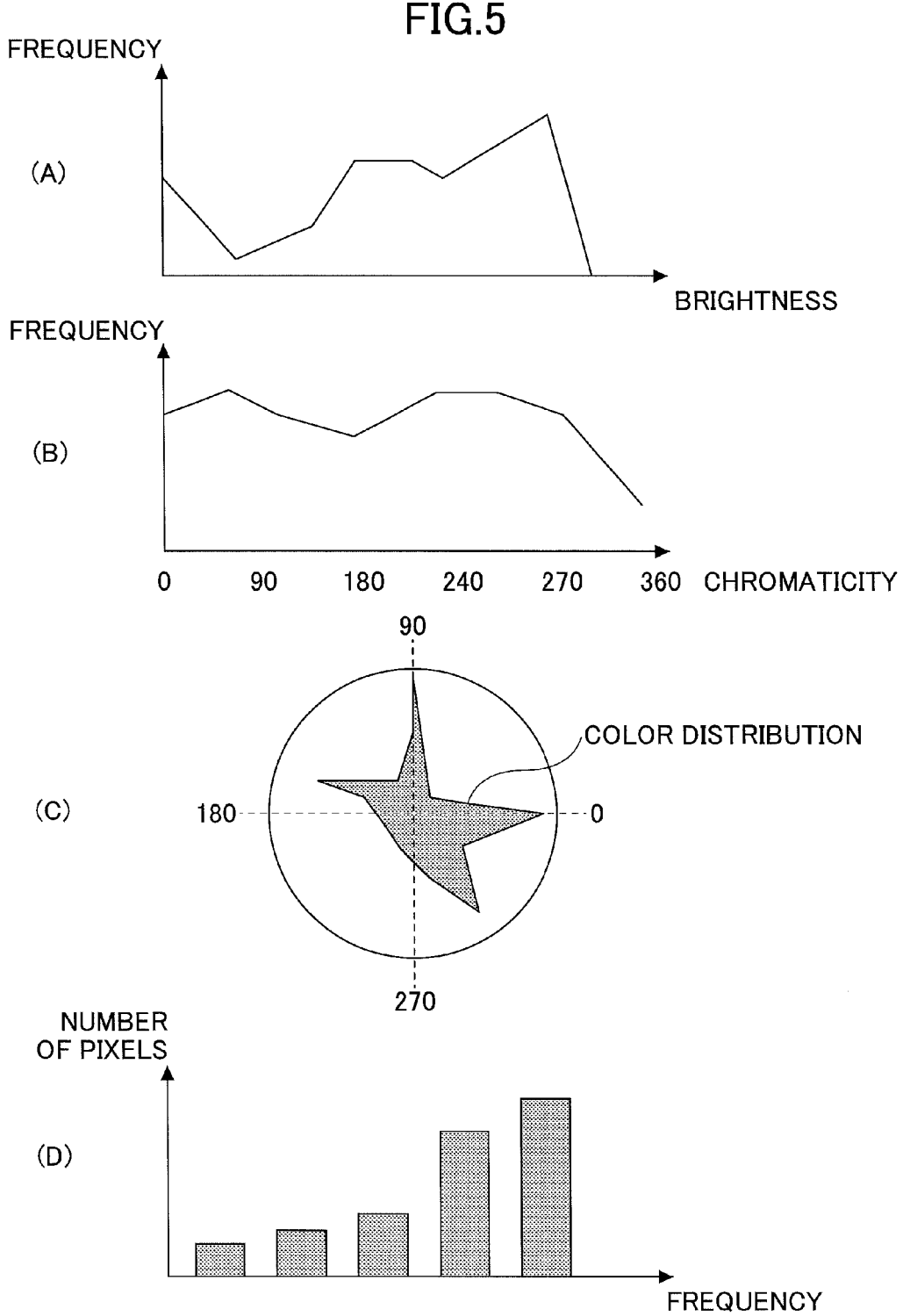
FIG. 5 illustrates exemplary histograms of elements of the embodiment.

FIG. 5 illustrates exemplary histograms of the elements of the embodiment. In the brightness histogram illustrated in (A) of FIG. 5, the abscissa represents the brightness information piece and the ordinate represents the frequency of appearance. Referring to (A) of FIG. 5, distribution of as many as about 300,000 of pixels in the brightness between 0 IRE and 100 IRE is extracted from one screen, as brightness distribution of a frequency of appearance of about 300,000. The histogram of the brightness distribution is illustrated in (A) of FIG. 5. This histogram is mainly used to control the brightness and the contrast. Within the embodiment, the brightness information piece is obtained as a frequency relative to a gradation level of the brightness using a Y (brightness) signal in YUV format.

In the chromaticity histogram illustrated in (B) of FIG. 5, the abscissa represents the chromaticity information piece (Saturation) and the ordinate represents the frequency of appearance. Referring to (B) of FIG. 5, distribution of as many as about 300,000 of pixels in the chromaticity between 0 degree and 360 degree is extracted from one screen, as chromaticity distribution of a frequency of appearance of about 300,000. The histogram of the chromaticity distribution is illustrated in (B) of FIG. 5. This histogram is mainly used to control color saturation or the like for each individual color. Within the embodiment, the chromaticity information piece is obtained as frequency of a gradation level of saturation for each color such as R, G, B, C, Y, M, and Flesh Tone (flesh color). At this time, a color phase range of R, G, B, Y, and M is about ±5° of a standard color phase value. The above range can be arbitrarily changed in view of the performance of the display screen, a user's preference, or the like.

Referring to (C) of FIG. 5, distribution of as many as about 300,000 of pixels in the color between 0 degree and 360 degree at an arbitrary color phase interval is extracted from one screen, as color distribution of a frequency of appearance of about 300,000. The histogram of the color distribution is illustrated in (C) of FIG. 5. For example, this histogram is used to control a color gradation such as Flesh Tone. Within the embodiment, although the color information piece can be obtained for each range of 1° at minimum, the range can be arbitrarily changed.

In the frequency histogram illustrated in (D) of FIG. 5, the abscissa represents the frequency information piece and the ordinate represents the frequency of appearance. Referring to (D) of FIG. 5, distribution of as many as about 300,000 of pixels in the frequency of appearance between a low frequency and a high frequency at an arbitrary frequency interval is extracted from one screen, as frequency distribution of a frequency of appearance of about 300,000. The histogram of the frequency distribution is illustrated in (D) of FIG. 5. For example, this histogram is used to control sharpness, noise or the like.

<Comparison with Threshold Values>

Referring to figures, an exemplary comparison with the threshold value in the threshold value comparing unit 17 is described next. FIG. 6 illustrates an exemplary threshold comparison of the embodiment. Referring to (A) of FIG. 6, an exemplary application of the threshold value to the brightness histogram illustrated in (A) of FIG. 5 is explained. Referring to (B) of FIG. 6, an exemplary application of the threshold value to the color histogram illustrated in (C) of FIG. 5 is explained. The threshold values may be determined by the setup unit 16.

Said differently, the setup unit 16 determines threshold values applied to the histograms such as straight lines a, b, and c in (A) of FIG. 6, a straight line d in (B) of FIG. 6, and a color interval of 280 to 310 degree. The setup unit 16 determines whether the control of the picture quality using each histogram is necessary.

For example, referring to (A) of FIG. 6, if the brightness of the brightness histogram is positioned at or below the threshold value a or at or above the threshold b or if the number of pixels is equal to or greater than the threshold value c, the picture image is controlled. For example, referring to (B) of FIG. 6, if the color histogram is positioned at or above the threshold d in a range of the color phase interval of 280 to 310 degrees, the picture quality is controlled.

Other than the examples illustrated in (A) and (B) of FIG. 5, a threshold value (Threshold) which is a control point for starting the control can be individually determined for the four types of the histogram data. Within the embodiment, the threshold values are compared with the histograms. The picture quality controlling unit 18 controls the picture quality based on the result of the comparison.

Within the embodiment, the threshold values are applied to the chromaticity histogram and the frequency histogram other than the examples illustrated in (A) and (B) of FIG. 6 as follows. To the chromaticity histogram, it is recommended to apply the threshold value in a range of about ±30° from the center in the regions of R, G, B, C, Y, Mg or the like. It is also possible to weight the thresholds and give priority to the thresholds for each color. To the frequency histogram, different threshold values are applied depending on the information resolution of the signal component and the resolution of the display screen. For example, if the resolution of the display screen is low, the frequency threshold is recommended to be about 1 to 3 MHz. If the resolution of the display screen is high, the frequency threshold is recommended to be about 3 to 5 MHz.

<Controlling Image Quality>

If it is determined necessary to control the image quality in the threshold value comparing unit 17, at least one of the plural LUTs generated by the reference table generation unit 15 is used to control the picture quality at a high speed.

The picture quality controlling unit 18 has functions of controlling an image. For example, the functions are Contrast Enhancer, Color Enhance, sharpness, Noise Reducer, or the like.

For example, with the function of Contrast Enhancer, an ogive (an S-shaped curve) is ordinarily drawn around average brightness of an image. The function of Contrast Enhancer is similar to the function of a γ correction curve with which a generally known Gain Curve undergoes a nonlinear control.

The function of Contrast Enhancer includes functions of Black Stretch for correcting the black level, White Peak Suppressor for correcting the white level, Blue Stretch for beautifying character information, White Stretch for beautifying cloud or the like in the sky, Black level Shift (Auto Pedestal) for offsetting Pedestal information of black.

The function of Color Enhance includes functions of color saturation control (Saturation) for changing saturations of each individual color phase, color control for changing a color phase gradations of each individual color phase, Y-C Delay adjustment for correcting timings of rise and decay of the brightness (Luminance) and Color, and Tracking for controlling a saturation ratio between the brightness and the color.

The function of sharpness includes a function of Edge Enhancer for clarifying a pulse-like rise and decay, with which the amount and the width of Pre-shoot/Over-Shoot are controlled.

Further, the function of Noise Reducer includes a function of N.R. for reducing high frequency noise. N.R. may be strongly applied when the signal contains many low frequency components. If N.R. is strongly applied to the signal when the signal contains many high frequency components, the resolution of the image drops.

When the thresholds are applied to the four types of the above described histograms and the reference table (LUT) is used for the signal of the image to perform the above functions, it is possible to rapidly optimize the picture quality. Further, within the embodiment, a multi-histogram may be used to generate a LUT. The multi-histogram is made by combining plural histograms among the four types of histograms. Then, the picture quality can be efficiently controlled using the multi-histogram.

An example of controlling the picture quality in the embodiment is as follows. If the image contains much information having high brightness, the image may be shifted toward black to facilitate visualization of the whole image. If the image contains much information having low brightness, the image may be shifted toward white to facilitate visualization of the whole image. If the image contains much information having intermediate brightness, the image may be shifted toward both black and white to facilitate visualization of the whole image.

If the image contains much color information having the red end of the spectrum, the color temperature is lowered and the color saturation in the red end of the image may be stressed. If the image contains much color information having the blue end of the spectrum, the color temperature is raised and the color saturation in the blue end of the image may be stressed. If the image contains much color information having the green end of the spectrum, the color temperature is fixed to a reference value and the color saturation in the green end of the image may be stressed. It is possible to set the color information, which is required to be characterized, to have a preferred color temperature and preferred color saturation.

If the image contains much information having low frequency components, a noise canceller is strongly applied to improve a Signal Noise Ratio. If the image contains much information having high frequency components, a noise canceller is not strongly applied to realize high resolution. The example of the picture quality control of the embodiment is not limited to the above, and other picture quality control can be predetermined.

<Generation of LUT of the Embodiment>

Next, an example of generation of the LUT of the embodiment is described. The LUT is generated by the reference table generation unit 15 based on the various setup conditions set by the above described setup unit 16.

Characteristics of one or plural histogram data are patterned so as to generate the LUT of the embodiment.

When the picture quality is controlled by using the histograms, it is necessary to simplify a control system which is to be complicated. Within the embodiment, a pattern of an arbitrary LUT is determined. Said differently, a pattern which is the best approximation to the histogram obtained from the input signal is selected and used for the picture quality control.

Two exemplary LUTs for the above picture quality control are described next. One of the two exemplary LUTs corresponds to a histogram pattern of a brightness type and the other of the two exemplary LUTs corresponds to a histogram pattern of a chromaticity type. The histogram data generated from the input image are checked by comparing with the predetermined histogram pattern (the LUT) to thereby determine controlled parameters so that the best picture quality is constantly obtainable.

Figure 7A:
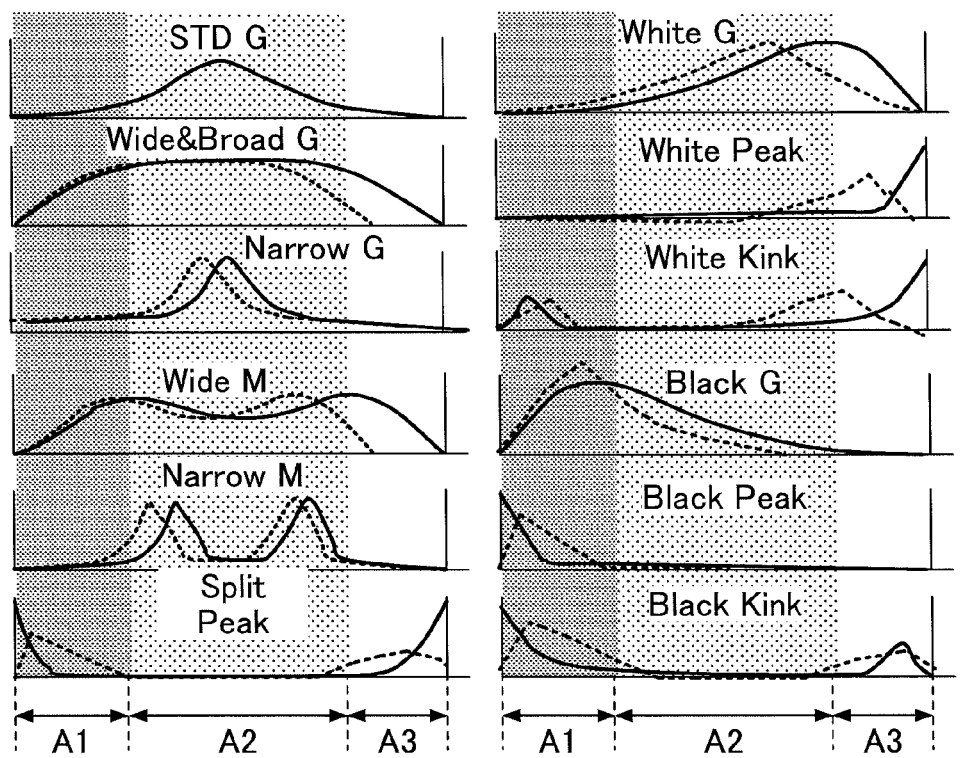
FIG. 7A illustrates an exemplary LUT generated in the embodiment.
Figure 7B:
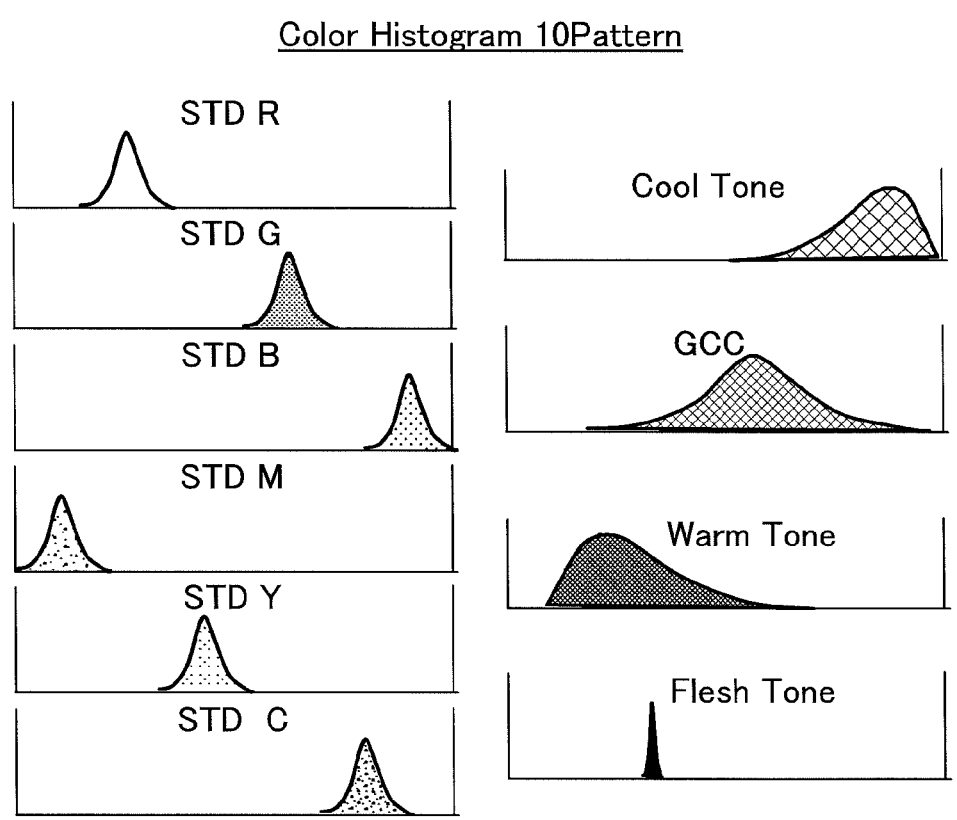
FIG. 7B illustrates an exemplary LUT generated in the embodiment.

FIG. 7A and FIG. 7B illustrate an exemplary LUT generated in the embodiment. FIG. 7A is an exemplary LUT corresponding to the brightness histogram (Luminance Histogram). FIG. 7B is an exemplary LUT corresponding to the color histogram (Color Histogram). It is possible to display the LUTs illustrated in FIG. 7A and FIG. 7B and make a user check the LUTs.

FIG. 7A illustrates typical 12 patterns of the brightness histogram pattern, as an example. The 12 patterns are "STD G", "Wide & Broad G", "Narrow G", "Wide M", "Narrow M", "Split Peak", "White G", "White Peak", "White Kink", "Black G", "Black Peak", "Black Kink", or the like. However, the embodiment of the present invention is not specifically limited thereto.

For example, the following conditions are used in controlling the picture quality using the above brightness histogram.
(1) The brightness histogram patterns are divided into three areas of a dark part ("A1" in FIG. 7A), an intermediate brightness part ("A2" in FIG. 7A), and a bright part ("A3" in FIG. 7A).
(2) The dark part is corrected by "Black Stretch" or an ogive.
(3) The intermediate part is corrected by an ogive in an interlocking type of Average Picture Level (APL).
(4) The bright part maintains peak brightness in a low APL, and is corrected by an ogive and White Peak Suppressor (WPS).

The above described various conditions are determined as picture quality controlled parameters. The picture quality controlled parameters respectively correspond to the histogram patterns. The picture quality for the input image signal is controlled on the basis of the picture quality controlled parameters. Specifically, the 12 patterns of the brightness histogram patterns are set, the LUTs are generated, and the picture quality is controlled using the LUT. Brightness and contrast of the input image signal can be dynamically controlled.

There is an example of the picture quality control using the brightness information piece. However, there is not a measure of generating a brightness histogram (e.g., the histogram of the dotted line in FIG. 7A) from the input image signal, comparing the brightness histogram with the above histogram pattern (e.g., the histogram of the solid line in FIG. 7A), extracting the corresponding histogram pattern, generating a picture quality controlled parameter to cancel an error between the brightness histogram and the extracted corresponding histogram pattern, and controlling the picture quality using the picture quality controlled parameter. Within the embodiment, by carrying out this measure not only for the brightness but also for the chromaticity, the color, and the frequency in a manner similar thereto, it is possible to control the picture quality with high accuracy and at a high speed.

FIG. 7B illustrates typical 10 patterns of the chromaticity pattern and the color histogram pattern, as an example. The 10 patterns are "STD R(Red)", "STD G(Green)", "STD B(Blue)", "STD M(Magenta)", "STD Y(Yellow)", "STD C(Cyan)", "Cool Tone", "GCC (Green Color Control)", "Warm Tone", "Flesh Tone", or the like. However, the embodiment of the present invention is not specifically limited thereto.

Referring to the example of FIG. 7B, typical 10 patterns of the chromaticity histogram pattern and the color histogram pattern are used for the control as in the following conditions.
(1) Three typical color areas of Warm, Green and Cool (±30 degrees) are used for the comparison.
(2) If Warm is dominant, the gradation of Flash Tone is corrected at around White Balance of 6500 (a color temperature of 6500°).
(3) If Green is dominant, the gradation of Green Tone is corrected at around White Balance of 9300 (a color temperature of 9300°).
(4) If Cool is dominant, the gradation of Blue Tone is corrected at around White Balance of 12000 (a color temperature of 12000°).

The above described various conditions are determined as picture quality controlled parameters. The picture quality controlled parameters respectively correspond to the plural histogram patterns. The picture quality for the input image signal is controlled on the basis of the picture quality controlled parameters. Specifically, the 10 patterns of the color histogram patterns are set, the LUTs are generated, and the picture quality is controlled using the LUT. Color picture quality of the input image signal can be dynamically controlled.

Within the embodiment, the picture quality is controlled by picking an arbitrary controlled parameter which is previously set in the LUT out of the LUT.

However, it is necessary to consider that correction of white color at White Balance of 6500 (a color temperature of 6500°) prevents acquisition of beautiful white, and that correction of red color at White Balance of 9300 and 12000 (color temperatures of 9300° and) 12000° prevents acquisition of beautiful red. Then, this white color at White Balance of 6500 is effectively corrected by Blue Stretch or White Stretch. These red colors at White Balance of 9300 and 12000 are effectively corrected by Flesh Tone. The above operations may be stored in the accumulation unit 13, which is previously provided, or the like. In this case, it is possible to immediately, optimally and effectively set the picture quality by following the operations properly in order.

Within the embodiment, the image contained in the input image signal is analyzed to determine a corresponding waveform of histogram out of the above LUTs, one of the 12 patterns of the above brightness histograms and one of the 10 patterns of the above color histograms are selected, contents of controlling the picture quality set for each combination of the patterns are applied to adjust the picture quality. The above LUT is an example, and another LUT may be generated and applied to the image signal. The number of the patterns in the LUTs are not limited to the above numbers and arbitrarily determined in response to picture quality, resolution, performance of the device, or the like to be required.

Figure 8:
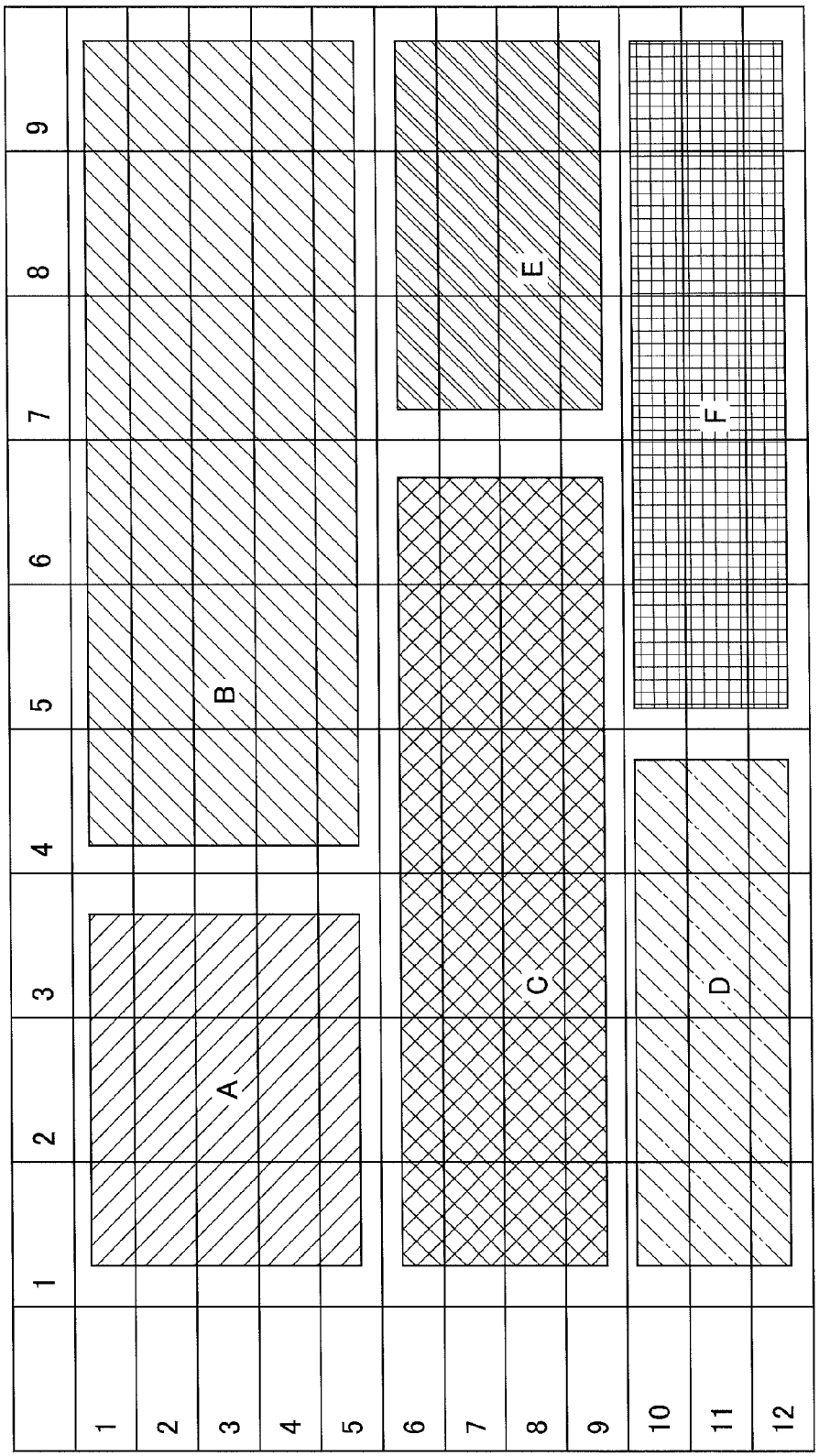
FIG. 8 illustrates an exemplary LUT generated from plural histogram patterns.

Further, within the embodiment, one LUT is generated by combining plural histogram patterns, and the picture quality can be controlled using the generated LUT. Hereinafter, the control using the combined histogram patterns is explained. FIG. 8 illustrates an exemplary LUT generated from plural histogram patterns. In the exemplary LUT, the ordinate represents brightness histogram patterns (total 12 patterns) and the abscissa represents chromaticity histogram patterns (total 9 patterns).

Referring to FIG. 8, the histogram of the brightness information piece and the histogram of the chromaticity information piece are obtained. Then, the obtained histograms are compared with the histogram patterns illustrated in FIG. 7A and FIG. 7B to obtain resembling histogram patterns, and the obtained resembling histogram patterns are applied to the LUT illustrated in FIG. 8. Thus, it is possible to extract controlled parameter corresponding to the obtained resembling histogram patterns out of the preset controlled parameters A to F. The picture quality can be controlled based on the extracted controlled parameter.

However, it is necessary to consider that correction of white color at White Balance of 6500 (a color temperature of 6500°) prevents acquisition of beautiful white, and that correction of red color at White Balance of 9300 and 12000 (color temperatures of 9300° and) 12000° prevents acquisition of beautiful red. Then, this white color at White Balance of 6500 is effectively corrected by Blue Stretch or White Stretch. These red colors at White Balance of 9300 and 12000 are effectively corrected by Flesh Tone. These processes can be immediately carried out by associating the controlled parameters to the histogram patterns using the above structure of the LUT illustrated in FIG. 8.

Said differently, the brightness histogram patterns and the color histogram patterns are combined like a matrix as illustrated in FIG. 8, and the picture quality is controlled using the LUT. Then, it is possible to dynamically control the picture quality by integrating the brightness histogram patterns and the color histogram patterns. The above operations may be stored in the accumulation unit 13, which is previously provided, or the like. In this case, it is possible to immediately, optimally and effectively set the picture quality by following the operations properly in order.

By generating a LUT obtained by combining plural histogram patterns out of the above four types of the brightness, chromaticity, color and frequency histogram patterns, it is possible to optimally and effectively improve the picture quality.

An exemplary combination is such that the color saturation is stressed if the brightness is high, and the color saturation is weakened if the brightness is low. Further, Noise Reduction is weakened if the brightness is high, and Noise Reduction is stressed if the brightness is low. Further, the color saturation is smaller than a reference value if there are many high frequency components, and the color saturation is greater than the reference value if there are many low frequency components. Further, the color saturation is stressed if there are many elementary color components of RGB, and the color saturation is weakened if there are many color components of CYM.

The exemplary combinations in the embodiment are not limited to the above described combinations. Another preset combination of the histogram patterns can also be used to control the picture quality.

<Exemplary Setup Screen Generated by the Screen Generation Unit>

Next, an exemplary setup screen generated by the screen generation unit for controlling the picture quality as described above is explained.

Figure 9A:
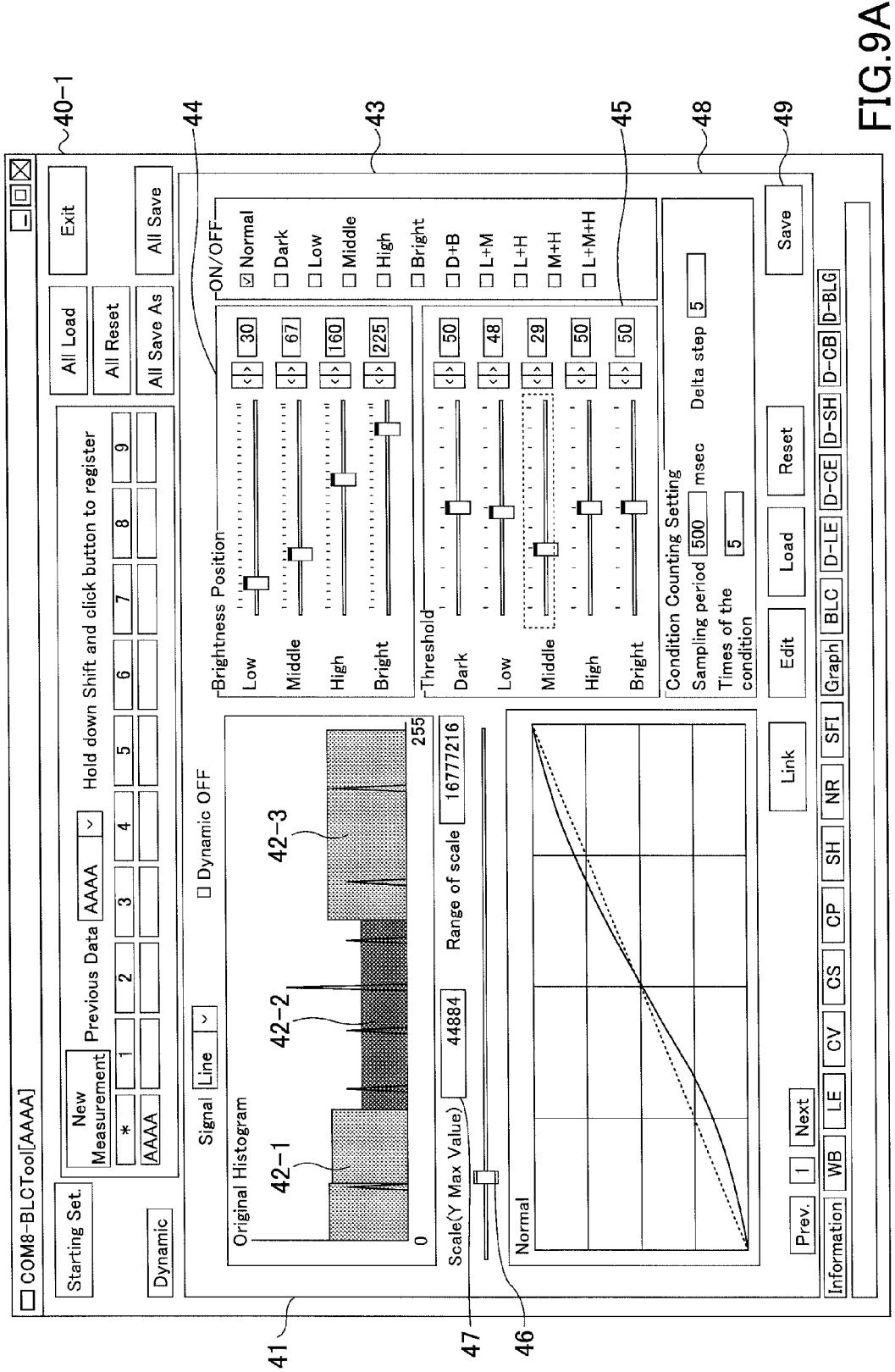
FIG. 9A illustrates an exemplary setup screen of the embodiment.
Figure 9C:
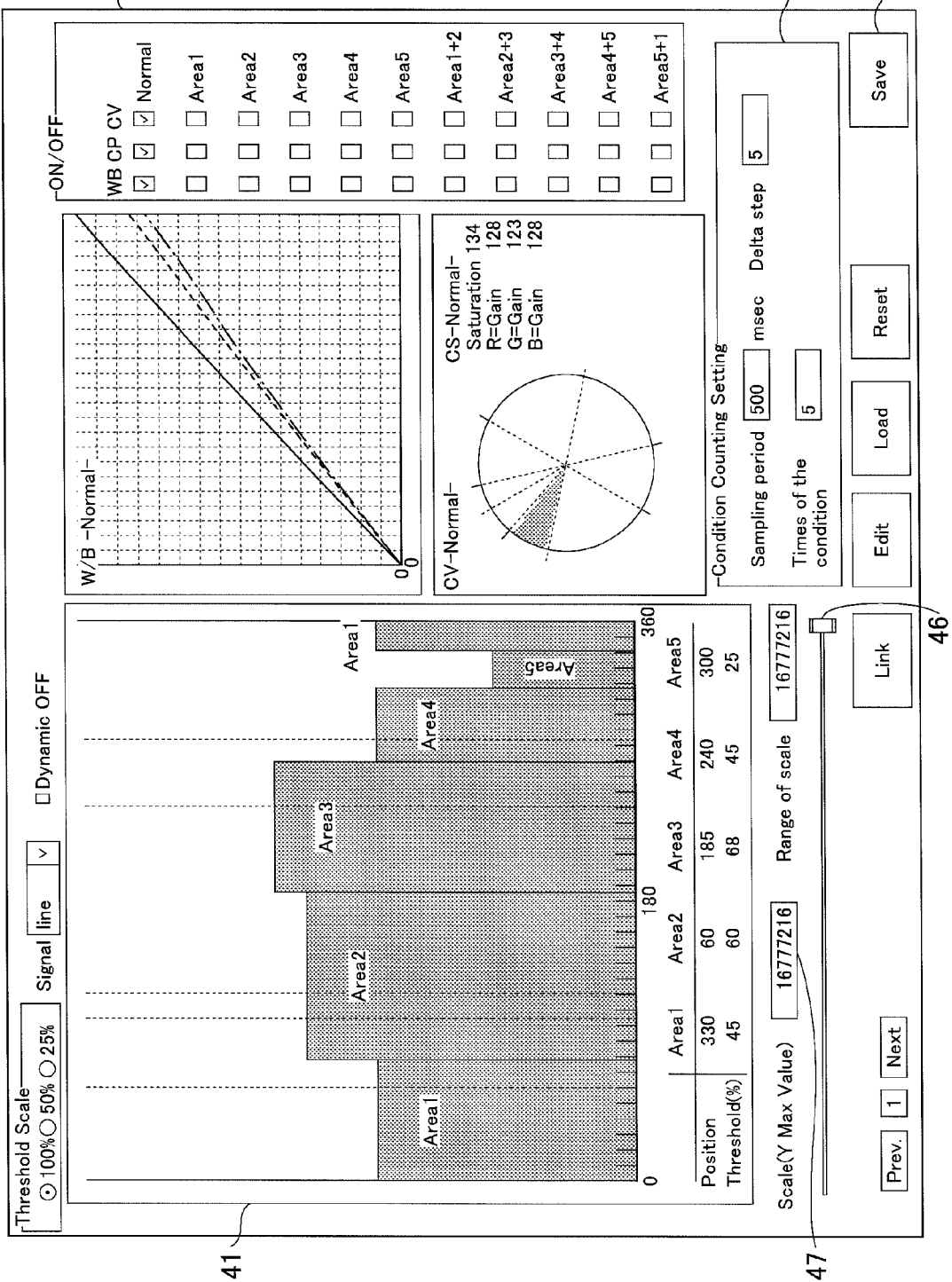
FIG. 9C illustrates an exemplary setup screen of the embodiment.

FIG. 9A to FIG. 9C illustrate an exemplary setup screen of the embodiment. FIG. 9A is an exemplary screen which is used for setting various conditions for dynamically controlling a brightness correction LUT using the brightness histogram. FIG. 9B is an exemplary screen which is used for setting various conditions for dynamically controlling a chromaticity correction LUT using the chromaticity histogram. FIG. 9C is an exemplary screen which is used for setting various conditions for dynamically controlling a color correction LUT using the color histogram.

These screens are displayed on the above described output unit 12 or the like. The various conditions are set by the user or the like using the setup unit 16.

On an original histogram display area 41 of the setup screen illustrated in FIG. 9A, the brightness histogram of the original image contained in the input image is graphed.

Within the embodiment, the specification of operation in the setup unit 16 is described below. The abscissa (brightness) of the brightness histogram on the original histogram display area 41 is divided into 5 areas. The divided areas are defined as "Dark", "Low", "Middle", "High", and "Bright" from the left of the graph to the right of the graph. The above 5 areas are not specifically limited in the embodiment of the present invention. For example, only three areas of "Low", "Middle", and "High" may be used. In this case, positions (a range) of the divided areas, a threshold value, or the like may be overlapped. For example, the divided area 42-1 of "Low", the divided area 42-2 of "Middle", and the divided area 42-3 of "High" are displayed in FIG. 9A.

For example, if the brightness exceeds the threshold value, a red color may be used. By providing an intensified display different from the other area, it is possible to visually distinguish the area where the brightness exceeds the threshold value. Based on the displayed histogram, the brightness correction LUT can be dynamically controlled.

The divided area may be set up on the division setup area 43 when the user inputs conditions by the input unit 11 or the like. "Normal" in the division setup area 43 designates that the divided area does not exist (no check box inside a check box area of "ON/OFF" is check-marked).

The area widths of the divided areas and the threshold values applied to the divided areas are set using a "Brightness Position" setup area 44 and a "Threshold" setup area 45 which are contained in the set-up screen 40-1. The "Brightness Position" setup area 44 is used to set up the widths of the 5 areas. The widths may be set by changing each left end of the 5 areas. The left end of "Dark" may be fixed to be 0.

The "Threshold" setup area 45 sets the thresholds for the divided areas. The unit of the threshold value is a percentage "%" relative to the number m of the entire pixels inside the screen. For example, in a case where the threshold value is th and the number of pixels included in the area is m×th/100 pixels or greater, it is determined that the threshold value is cleared (overcome).

The brightness correction LUTs may be allocated to each divided area and combinations of the divided areas. The brightness LUTs are switched between the divided areas when the brightness inside the divided area exceeds the threshold value or the divided areas are combined (as a switching condition).

Priorities may be given to the divided areas. For example, the priorities of "Dark" and "Bright" may be higher than the other "Low", "Middle", and "High". Said differently, if the divided area of "Dark" and the divided area of "Bright" area exceed the threshold values, the brightness LUT is switched between "Dark" and "Bright" and at the combination of "Dark" and "Bright" (the switching condition).

Referring to FIG. 9A, "Scale" can be arbitrarily changed using a slider 46 and an edit box 47. The value corresponding to the upper end of the ordinate of the graph of the histogram can be changed by a value designated by the slider 46 or the edit box 47. Thus, the height of the histogram to be displayed can be changed. Referring to FIG. 9A, "Range of scale" can edit the maximum value of the adjustable range of the slider.

Further, in "Condition Counting Setting" area 48, "Sampling Period" sets a time cycle of a dynamic control (a time cycle of reading the histogram and checking the condition) using a unit of msec. "Times of the Condition" designates the number of times of switching the brightness correction table when the brightness inside the divided area continuously exceeds the threshold value.

The contents set by the setup screen 40-1 as described above can be stored in the accumulation unit 13 by selecting a "Save" button 49. The selection may be done by clicking a button on the input unit 11 such as a mouse. The stored contents may be read out when necessary.

Referring to FIG. 9B and FIG. 9C, the contents set by the setup screens 40-2 and 40-3 are stored and read out in a manner similar to the setup screen 40-1. In the setup screens 40-2 and 40-3 illustrated in FIG. 9B and FIG. 9C, various conditions for the dynamic controls of the chromaticity correction LUT and the color correction LUT are set, respectively.

In order to divide into the divided areas, the abscissa (the color of 0 degree to 360 degree) of the histogram can be divided into 7 areas respectively around Red, Green, Blue, Cyan, Magenta, Yellow, and Skin. Unlike the brightness histogram, a gap may exist between the divided areas. The number of the divided areas is not specifically limited in the embodiment of the present invention. For example, referring to original histogram display areas 41 of FIG. 9B and FIG. 9C, there may be 5 divided areas (Area 1 to Area 5).

The widths and the threshold values of the divided areas can be adjusted by changing widths and center positions of the divided area on the original histogram display area 41. The unit of the threshold value is a percentage "%" relative to the total number of the pixels. The color correction LUT and the color basic setup are defined for each divided area. If there is the divided area in which the number of pixels exceeds the threshold value level in a process of comparing the threshold values performed by the threshold value comparing unit 17, the picture quality is controlled using the LUT defined for the divided area.

Within the embodiment, if the threshold value is compared based on the above setup condition by the threshold value comparing unit 17, the histogram generated from the input image signal is obtained and the threshold value condition is checked at s time cycle designated by "Sampling Period" in the "Condition Counting Setting" area 48. If the number of pixels continuously exceeds the number designated by "Times of the condition", setup is switched over. Said differently, if "1" is set to "Times of the condition", it is possible to immediately switch the setup over.

Meanwhile, the contents set in the above setup screens 40-1 to 40-3 are not specifically limited. Further, the screen generation unit 19 generates a setup screen for setting various conditions for the picture quality control using, for example, the frequency histogram. The generated setup screen may be displayed by the output unit 12 so as to present the generated setup screen to the user or the like.

As described, by generating and presenting the setup screen, the user can easily set an accurate value as aimed without failing to set the setup conditions.

<Picture Quality Control Process>

Figure 10:
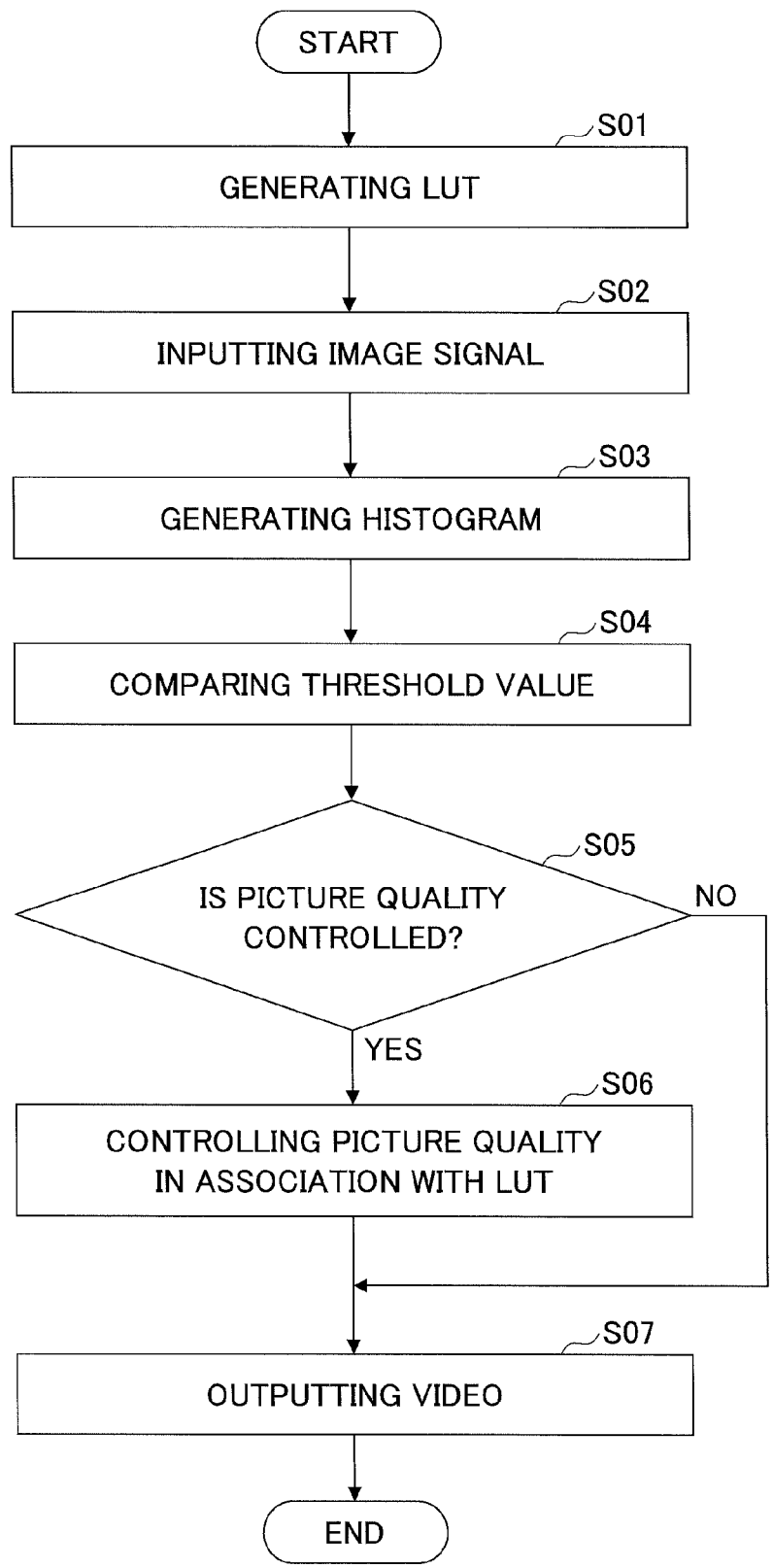
FIG. 10 is a flowchart for schematically illustrating a picture quality control process of the embodiment.

An example of the above-described picture quality control process is further described using a flowchart. FIG. 10 is a schematic flowchart illustrating an exemplary picture control process of the embodiment. Before starting the process of FIG. 10, the various information such as the threshold values are previously set.

Referring to FIG. 10, a reference table (LUT) is generated to improve the picture quality in step S01. Here, the process of step S01 may be performed before starting the picture quality control process illustrated in FIG. 10. In this case, the generated LUTs are stored in the accumulation unit 13 or the like and read out when the picture quality control process is carried out.

Next, an image signal captured by an imaging unit and displayed on a screen of a display unit is input in step S02. At least one of histograms corresponding to the brightness information piece, the chromaticity information piece, the color information piece, and the frequency information piece is generate from the image data contained in the input image signal in step S03.

Next, the generated histogram and the preset threshold value are compared in step S04. Then, it is determined whether the picture quality of the image is to be controlled from the result of the comparison in step S05. If the picture quality of the input image is to be controlled in YES of step S05, the histogram obtained in step S03 is associated with the LUT for improving the picture quality generated in step S02. The picture quality of the input image is controlled using the controlled parameter corresponding to the histogram pattern in step S06. After ending the step S06 or if the image is not subject to the picture quality control by the process of step S05 (No of step S05), the image is output in step S07.

While the image signal is input, the process illustrated in FIG. 10 is repeated at a predetermined timing, at a predetermined interval, or constantly.

Therefore, it is possible to realize an image having high definition and high picture quality using the above picture quality control process. Further, when the above process is carried out using a computer, an execution program being a picture quality control program is installed on the computer. Thus, the picture quality can be easily controlled using the computer or the like.

As described, within the embodiment of the present invention, the image signal is processed so that the picture quality of the image is dynamically controlled in association with the image information using the various histogram detections. Thus, the optimum picture quality with high definition can be easily obtained at a low cost.

Specifically, for example, when picture quality of an image signal component is controlled, at least one of 4 histogram information pieces, i.e., brightness histogram, chromaticity histogram, color histogram, and frequency histogram information pieces, is detected. Then, the histogram of the image signal component undergoes 4 types of histogram frequency information analysis. For example, based on an analysis of 2 histogram patterns of brightness and color or the like, succeeding picture quality controls such as contrast control, black level control, sharpness control, chromaticity Hew, Saturation, Vector (HSV) control, noise control are carried out. Thus, the image having high definition and stable high picture quality can be reproduced.

Within the embodiment, it is possible to control picture qualities of imaging apparatuses at a low cost so as to obtain high definition while enabling quantitative picture quality evaluation, accurate analysis, and accurate adjustment.

The above described picture quality control function is a typical example. The embodiment of the present invention is not limited thereto. For example, a recently popular function of controlling impulse of an LCD back light may be controlled to change brightness, contrast, color or the like. Within the embodiment of the present invention, there is provided a high picture quality image processing technique by which the optimum detection and the optimum control are enabled and the image with high definition and high picture quality is realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The international application is based on Japanese Priority Patent Application No. 2010-012053 filed on Jan. 22, 2010, the entire contents of Japanese Priority Patent Application No. 2010-012053 are hereby incorporated herein by reference.

Explanation Of Reference Signs
10: picture quality controlling device
11: input unit
12: output unit
13: accumulation unit
14: histogram generation unit
15: reference table generation unit
16: setup unit
17: threshold value comparing unit
18: picture quality controlling unit
19: screen generation unit
20: transmitting and receiving unit
21: control unit
31: input device
32: output device
33: drive device
34: auxiliary storage device
35: memory device
36: CPU
37: network connection device
38: recording medium
40: setup screen
41: original histogram display area
42: divided area
43: division setup area
44: "Brightness Position" setup area
45: "Threshold" setup area
46: slider
47: edit box
48: "Condition Counting Setting" area
49: "Save" button

The invention claimed is:

1. A picture quality controlling device that controls a picture quality for an image signal which is input, the picture quality controlling device comprising:
a histogram generation unit configured to generate a histogram for at least one of a brightness information piece, a chromaticity information piece, a color information piece, and a frequency information piece, the brightness, chromaticity, color, and frequency information pieces being obtained from an image contained in the image signal;
a threshold value comparing unit configured to compare the histogram generated by the histogram generation unit with a threshold value previously set for each of the histogram in order to determine whether control of the picture quality for the image signal is necessary; and
a picture quality controlling unit configured, if the control of the picture quality for the image signal is determined to be necessary based on a result obtained by the threshold value comparing unit, to
extract a histogram pattern corresponding to the histogram generated by the histogram generation unit from a reference table including a plurality of predetermined histogram patterns, and
control the picture quality for the image signal based on a controlled parameter corresponding to the extracted histogram pattern.

2. The picture quality controlling device according to claim 1, further comprising:
a reference table generation unit configured to generate the reference table including the plurality of predetermined histogram patterns in association with each of the brightness, chromaticity, color, and frequency information pieces.

3. The picture quality controlling device according to claim 2,
wherein the reference table generation unit generates the reference table including a matrix of the histogram patterns corresponding to the brightness information piece and the color information piece.

4. The picture quality controlling device according to claim 1, further comprising:
a screen generation unit configured to generate a display screen enabling a user to set the threshold value.

5. A picture quality controlling method that controls a picture quality for an image signal which is input, the picture quality controlling method comprising:
generating, by a histogram generation unit, a histogram for at least one of a brightness information piece, a chromaticity information piece, a color information piece, and a frequency information piece, the brightness, chromaticity, color, and frequency information pieces being obtained from an image contained in the image signal;
comparing, by a threshold value comparing unit, the histogram generated by the histogram generation unit with a threshold value previously set for each of the histogram in order to determine whether control of the picture quality for the image signal is necessary; and
controlling, by a picture quality controlling unit, the picture quality, if the control of the picture quality for the image signal is determined to be necessary based on a result obtained by the comparing, by
extracting, by the picture quality controlling unit, a histogram pattern corresponding to the histogram generated by the histogram generation unit from a reference table including a plurality of predetermined histogram patterns, and
controlling, by the picture quality controlling unit, the picture quality for the image signal based on a controlled parameter corresponding to the extracted histogram pattern.

6. The picture quality controlling method according to claim 5, further comprising:
generating, by a reference table generation unit, the reference table including the plurality of predetermined histogram patterns in association with each of the brightness, chromaticity, color, and frequency information pieces.

7. The picture quality controlling method according to claim 6,
wherein the generating, by the reference table generation unit, the reference table generates the reference table including a matrix of the histogram patterns corresponding to the brightness information piece and the color information piece.

8. The picture quality controlling method according to claim 5, further comprising:
generating, by a screen generation unit, a display screen enabling a user to set the threshold value.

9. A computer-readable, non-transitory medium storing a picture quality controlling program that controls a picture quality for an image signal which is input, the picture quality controlling program causing a target computer to function as:
a histogram generation unit configured to generate a histogram for at least one of a brightness information piece, a chromaticity information piece, a color information piece, and a frequency information piece, the brightness, chromaticity, color, and frequency information pieces being obtained from an image contained in the image signal;
a threshold value comparing unit configured to compare the histogram generated by the histogram generation unit with a threshold value previously set for each of the histogram in order to determine whether control of the picture quality for the image signal is necessary; and
a picture quality controlling unit configured, if the control of the picture quality for the image signal is determined to be necessary based on a result obtained by the threshold value comparing unit, to
extract a histogram pattern corresponding to the histogram generated by the histogram generation unit from a reference table including a plurality of predetermined histogram patterns, and
control the picture quality for the image signal based on a controlled parameter corresponding to the extracted histogram pattern.

10. The computer-readable, non-transitory medium according to claim 9, further causing the target computer to function as:
a reference table generation unit configured to generate the reference table including the plurality of predetermined histogram patterns in association with each of the brightness, chromaticity, color, and frequency information pieces.

11. The computer-readable, non-transitory medium according to claim 10,
wherein the reference table generation unit generates the reference table including a matrix of the histogram patterns corresponding to the brightness information piece and the color information piece.

12. The computer-readable, non-transitory medium according to claim 9, further causing the target computer to function as:
a screen generation unit configured to generate a display screen enabling a user to set the threshold value.

* * * * *